United States Patent
Friedman

(10) Patent No.: US 6,675,353 B1
(45) Date of Patent: Jan. 6, 2004

(54) METHODS AND SYSTEMS FOR GENERATING XML DOCUMENTS

(75) Inventor: Gregory S. Friedman, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/360,766

(22) Filed: Jul. 26, 1999

(51) Int. Cl.[7] .......................... G06F 13/00; G06F 15/00
(52) U.S. Cl. .................... 715/513; 715/500.1; 715/506; 709/246; 709/226
(58) Field of Search ................................. 707/513, 506; 715/513, 500.1, 506; 709/246, 226

(56) References Cited

U.S. PATENT DOCUMENTS

| | | | | |
|---|---|---|---|---|
| 5,581,760 | A | * 12/1996 | Atkinson et al. | 717/108 |
| 6,012,098 | A | * 1/2000 | Bayeh et al. | 709/246 |
| 6,240,429 | B1 | * 5/2001 | Thornton et al. | 707/500 |
| 6,249,844 | B1 | * 6/2001 | Schloss et al. | 711/122 |
| 6,463,440 | B1 | * 10/2002 | Hind et al. | 707/102 |

OTHER PUBLICATIONS

World Wide Web Consortium Working Draft, Namespaces in XML, May 18, 1998, pp. 1–3.*
E. James Whitehead, Jr., World Wide Web Distributed Authoring and Versioning [WebDAV]: An Introduction, 1997, pp. 3–8.*
John Cowan, 'John Cowan's XML Index', Archived 1998, pp. 1–6.*
Tim Bray, Namespaces in XML, World Wide Web Consortium, Jan. 14, 1999, pp. 1–13.*
Junichi Suzuki, 'Managing the software design documents with XML', Annual ACM Conference on Systems Documentation, ACM Press, 1998, pp. 127–136.*

* cited by examiner

Primary Examiner—Stephen S. Hong
Assistant Examiner—Matthew Ludwig
(74) Attorney, Agent, or Firm—Lee & Hayes, PLLC

(57) ABSTRACT

Methods and systems are described for generating an XML document that do not require a hierarchical tree structure to be built and stored in memory in order for the document to be built. In one embodiment, a request object is provided and is used to receive information from a client that desires to generate an XML document and to organize the information into an XML document. Information is first accumulated by the request object and then transformed into an appropriate XML document. The information that is accumulated by the request object includes the namespaces or namespace values that are to be incorporated into the request. All of the namespaces or namespace values are collected and organized into a data structure. Prefixes are assigned to and stored with each namespace value that is placed in the data structure. Some of the namespace values can be reserved and have predefined or reserved prefixes that serve to support legacy servers. A namespace arbiter object can be utilized by the request object to manage and oversee maintenance of the data structure that contains the namespace values and their prefixes. Additional objects are provided and manage associations of the namespace prefixes, properties and, in some embodiments, property values. An XML document is generated using the data structures that hold the namespace name values, their prefixes, properties, and property values without having to build and store a hierarchical tree structure to represent the XML document.

67 Claims, 11 Drawing Sheets

204

| 206 — Allocated Namespaces — 208 | | — 210 | — 212 |
|---|---|---|---|
| Moniker | Expanded namespace | Prefix | Use status |
| 1 | DAV | D | T |
| 2 | http:// schemas.microsoft.com/ hotmail | h | F |
| 3 | urn:schemas:httpmail: | hm | F |
| 4 | urn:schemas:mailheader: | m | F |
| 5 | urn:schemas:contacts: | c | F |
| 6 | FOO | _1 | X |
| 7 | DOO | _2 | X |
| 8 | | | |

{ Rows 1–5: RESERVED }

*Fig. 9*

METHODS AND SYSTEMS FOR GENERATING XML DOCUMENTS

TECHNICAL FIELD

This invention relates to methods and systems for generating Extensible Markup Language (XML) documents. More particularly, the invention concerns generating XML documents without building and saving in memory a hierarchical tree structure that represents the XML document.

BACKGROUND

Extensible Markup Language (XML) is a meta-markup language that provides a format for describing structured data. XML is similar to HTML in that it is a tag-based language. By virtue of its tag-based nature, XML defines a strict tree structure or hierarchy. XML is a derivative of Standard Generalized Markup Language (SGML) that provides a uniform method for describing and exchanging structured data in an open, text-based format. XML utilizes the concepts of elements and namespaces. Compared to HTML, which is a display-oriented markup language, XML is a general purpose language for representing structured data without including information that describes how to format the data for display.

XML "elements" are structural constructs that consist of a start tag, an end or close tag, and the information or content that is contained between the tags. A "start tag" is formatted as "<tagname>" and an "end tag" is formatted as "</tagname>". In an XML document, start and end tags can be nested within other start and end tags. All elements that occur within a particular element must have their start and end tags occur before the end tag of that particular element. This defines a strict tree-like structure. Each element forms a node in this tree, and potentially has "child" or "branch" nodes. The child nodes represent any XML elements that occur between the start and end tags of the "parent" node.

XML accommodates an infinite number of database schemas. Within each schema, a "dictionary" of element names is defined. The dictionary of element names defined by a schema is referred to as a "namespace." Within an XML document, element names are qualified by namespace identifiers. When qualified by a namespace identifier, a tag name appears in the form "[namespace]:[tagname]". This model enables the same element name to appear in multiple schemas, or namespaces, and for instances of these duplicate element names to appear in the same XML document without colliding. Start tags can declare an arbitrary number of "attributes" which declare "property values" associated with the element being declared. Attributes are declared within the start tag using the form "<[tagname] [attribute1], [attribute2]. . . , [attributeN]>", where an attribute1 through attributeN are declarations of an arbitrary number of tag attributes. Each attribute declaration is of the form "[attributeName]=[attributeValue]" where each attribute is identified by a unique name followed by an "=" character, followed by the value of the attribute.

Within an XML document, namespace declarations occur as attributes of start tags. Namespace declarations are of the form "xmlns:[prefix]=[uri]". A namespace declaration indicates that the XML document contains element names that are defined within a specified namespace or schema. Prefix is an arbitrary designation that will be used later in the XML document as an indication that an element name is a member of the namespace declared by uri. The prefix is valid only within the context of the specific XML document. "Uri" or universal resource indicator is either a path to a document describing a specific namespace or schema or a globally unique identifier of a specific namespace or schema. Uri is valid across all XML documents. Namespace declarations are "inherited", which means that a namespace declaration applies to the element in which it was declared as well as to all elements contained within that element.

Namespace inheritance within an XML document allows non-qualified names to use "default" namespaces. Default namespaces are explicitly declared as attributes of start tags. Default namespace declarations are of the form "xmlns=[uri]". Note that the declaration of a default namespace is equivalent to the declaration of a non-default namespace but the prefix is omitted. A namespace specification within an XML document is said to have a "scope" which includes all child nodes beneath the namespace specification.

One exemplary usage of XML is the exchange of data between different entities, such as client and server computers, in the form of requests and responses. A client might generate a request for information or a request for a certain server action, and a server might generate a response to the client that contains the information or confirms whether the certain action has been performed. The contents of these requests and responses are "XML documents", which are sequences of characters that comply with the specification of XML. In many cases, the process of generating these XML documents involves the building, in memory, of a hierarchical tree structure. Once the hierarchical tree structure is built, in its entirety, the actual XML document in proper syntactic form can then be assembled. Consider the following exemplary XML code:

```
--<trans:orders
  xmlns:person="http://www.schemas.org/people"
          xmlns:dsig= "http://dsig.org"
  xmlns:trans="http://www.schemas.org/transactions">
    <trans:order>
      <trans:sold-to>
        <person:name>
          <person:last-name>Layman</person:last-name>
          <person:first-name>Andrew</person:first-name>
        </person:name>
      </trans:sold-to>
      <trans:sold-on>1997-03-17</trans:sold-on>
      <dsig:digital-signature>1234567890</dsig:digital-signature>
    </trans:order>
</trans:orders>
```

This code includes three XML namespace declarations that are each designated with "xmlns". The declarations include a prefix, e.g. "person", "dsig", and "trans" respectively, and the expanded namespace to which each prefix refers, e.g. "http://www.schemas.org/people", "http://dsig.org", and "http://www.schemas.org/transactions" respectively. This code tells any reader that if an element name begins with "dsig:" its meaning is defined by whoever owns the "http://www.dsig.org" namespace. Similarly, elements beginning with the: "person:" prefix have meanings defined by the "http://www.schemas.org/people" namespace and elements beginning with the "trans" prefix have meanings defined by the "http://www.schemas.org/transactions" namespace. It is important to note that another XML document that incorporated elements from any of the namespaces included in this sample might declare prefixes that are different from those used in this example. As noted earlier, prefixes are arbitrarily defined by the document author and have meaning only within the context of the specific element of the specific document in which they are declared.

Namespaces ensure that element names do not conflict, and clarify who defined which term. They do not give instructions on how to process the elements. Readers still need to know what the elements mean and decide how to process them. Namespaces simply keep the names straight.

FIG. 1 shows how the structure of the above code can be represented in a hierarchical tree structure. In FIG. 1, all of the elements or nodes are set out in an exemplary tree that represents the XML document. Such a structure is typically constructed in memory, with each node containing all data necessary for the start and end tags of that node.

It has been typical in the past to build the entire tree structure, such as the one shown in FIG. 1, before generating the XML document itself. For large XML documents, this can consume a great deal of memory and processor time. Thus, it would be desirable to avoid this process if at all possible.

Accordingly, this invention arose out of concerns associated with providing improved methods and systems for generating XML documents that do not require or need a hierarchical tree structure to be built and stored in memory in order for the actual body of the XML document to be generated. This invention also addresses the algorithms and data representations involved in managing and coordinating the generation of namespace declarations and prefix allocations involved in generating an XML document.

SUMMARY

Methods and systems are described for generating an XML document that do not require a hierarchical tree structure to be built and stored in memory in order for the document to be built. These include methods and systems for managing and coordinating the generation of namespace declarations and prefix allocations involved in generating an XML document. Aspects of the invention are particularly suited for use in the context of client/server architectures. Applicability of the inventive aspects, however, can extend outside of this client/server architecture.

In the described embodiment, a "request object" is provided and is used to receive information from a client that desires to generate an XML request and to organize the information into an XML request. Information is first accumulated by the request object and is then transformed into an appropriate XML document. The information that is accumulated by the request object includes the namespaces that are to be incorporated into the request. All of the namespaces are collected and organized into a data structure. Prefixes are assigned to and stored with each namespace value that is placed in the data structure. Some of the namespace values are reserved and have predefined or reserved prefixes that serve to support specific legacy servers. These specific legacy servers have non-compliant XML parsers that require specific, non-arbitrary, namespace prefixes to be used to identify specific namespaces or schemas.

In one embodiment of this invention, a client computer generates and sends a request to server computer requesting information about objects that exist on the server. Specifically, the client requests values of properties such as author, last modification date, or subject, associated with documents on the server. The body of the request sent by the client to the server is an XML document that specifies the properties the client wishes to retrieve. The properties may be elements in one or more namespaces. In this case the request object is specialized to generate a specific type of XML document that is a request for property values.

In the described embodiment, a "namespace arbiter" is utilized by the request object to manage and oversee maintenance of the data structures that contain the namespace values and their prefixes. When a client wishes to generate a request for property values it provides the names of all the namespaces (also referred to as "namespace values") to the namespace object. The process of providing the namespaces involves the client invoking a method in the request object once per namespace to be added. The result of each method invocation is a moniker, returned from the request object to the client, which uniquely identifies the namespace. The moniker represents the namespace value and is unique for each namespace that is to appear in the request. The moniker is then used by the client for additional calls to the request object. Once the client has added all of the namespaces to the request object, and received a moniker for each namespace, the client will invoke methods in the request object to add the properties, such as author, etc., to the request. For each property requested, the client will provide the moniker identifying the namespace in which the element exists as well as the name of the property requested.

The specified properties are maintained in a data structure that organizes the properties and the prefixes that are associated with the namespace to which the property pertains. In the described embodiment, data structures can be defined for adding new properties or for modifying property values of existing properties.

Thus, a collection of namespaces, associated prefixes, and associated properties is defined prior to building the XML document. The data structures are flat structures. Once all of the information has been collected by the request object, it can be rendered into an XML document by the request object and sent to an appropriate server for processing.

BRIEF DESCRIPTION OF THE DRAWINGS

FIG. 9 shows a data structure in accordance with one embodiment of the invention.

DETAILED DESCRIPTION

Overview

Various embodiments of the invention described below enable an XML document to be generated without the need to generate and maintain a hierarchical tree structure that represents the XML document. This results in overhead savings insofar as memory use and consumption is concerned.

Figure 1:
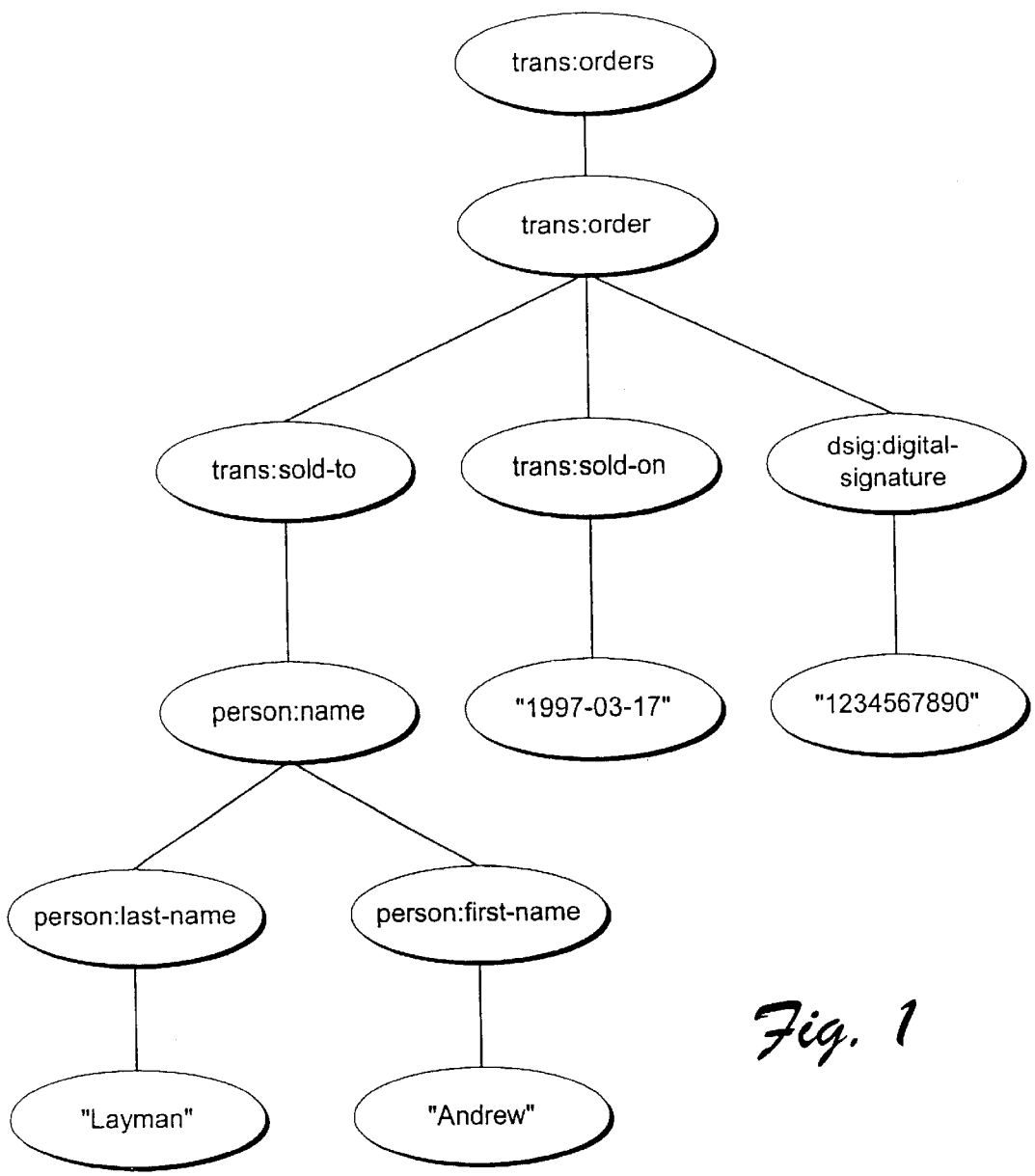
FIG. 1 is diagram of a hierarchical tree structure that represent an XML document.
Figure 2:
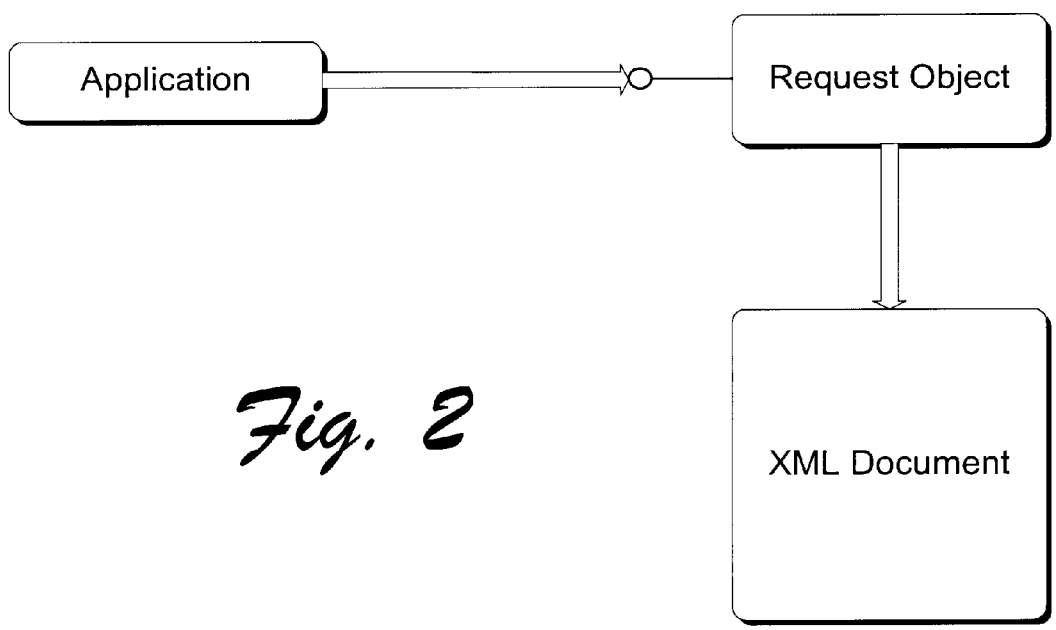
FIG. 2 is a conceptual diagram of a request object and shows its interaction with a client application and an XML document.

In the described embodiment, a request object is used to receive information from a client application that desires to generate an XML document. FIG. 2 shows a request object that is a C++ object. This is not, however, intended to limit the request object to only C++ objects. The client application sends information to the request object in the form of a series of calls that it makes to the object. Responsive to the application's calls, the request object provides information back to the application. Accordingly, the application can give the request object all of the information it needs to generate a syntactically correct XML document.

Information that is provided by the application is first accumulated by the request object and then transformed into an appropriate XML document. The information that is accumulated by the request object includes the namespaces or namespace values that are to be incorporated into the document. For purposes of this document, the terms "namespace" and "namespace value" are used interchangeably. All of the namespaces or namespace values are collected and organized into a data structure. Prefixes are assigned to and stored with each namespace value that is placed in the data structure. Some of the namespace values are reserved and have predefined or reserved prefixes. In the described embodiment, a namespace arbiter (also referred to as a "namespace object") is utilized by the request object to manage and oversee maintenance of the data structure that contains the namespace values and their prefixes. When a client, such as a software application, wishes to build an XML document, it provides the namespaces (also referred to as "namespace values") to the namespace object. The namespace object then returns one moniker to the client for each namespace the client adds. Each moniker uniquely identifies the associated namespace value. The moniker can then be used by the client in additional calls to the request object. For example, in one embodiment additional calls are made to specify the specific properties in which the client is interested. Thus, the client uses the individual monikers to specify the properties for the individual namespaces that are to appear in the document.

In addition to accumulating data related to namespaces, the request object also accumulates additional information that is pertinent to the XML document the client is in the process of generating. The specific content of the additional information is dependent on the type of document the client desires. In one exemplary case, a client uses this invention to generate an XML document that will be sent to a "server" to request information about "resources" that exist on the server. One example of this use is the internet protocol "WebDAV". WebDAV is a set of extensions to the internet protocol "HTTP" (HyperText Transfer Protocol). HTTP, as referred to herein, refers to any standard of HTTP, as described by the HTTP working group and available on the website "http://www.w3.org". WebDAV, as referred to herein, refers to any standard of WebDAV such as the version described in the reference E. James Whitehead, Jr., Word-Wide-Web Distributed Authoring and Versioning (WebDAV): An Introduction, in StandardView, Vol 5., No. 1, March 1997, pages 3–8. The portion of WebDAV which describes the ability of a client to retrieve or set properties is described in the reference Internet Task Force (IETF) Request for Comment (RFC) 2518, entitled HTTP Extensions for Distributed Authoring, by Y. Goland, E. Whitehead, A. Faizi, S. Carter and D. Jensen, and dated February 1999. The WebDAV extensions to HTTP enable a client computer to exercise granular control over resources that exist on a server computer.

HTTP is a "verb-based" protocol wherein requests sent from clients to servers are of the form "verb object". The verb indicates the action the server is to carry out, and the object is the target of that action. HTTP defines a limited set of verbs that include "GET", "PUT", and "POST". These verbs allow clients to retrieve objects from servers or to place objects on servers. WebDAV extends the set of verbs provided by HTTP by adding, among others, verbs to enable client computers to retrieve granular values of specific resource-based properties and to set granular properties on resources. Specifically, the verb PROPFIND can be used to retrieve property values, and the verb PROPPATCH can be used to set property values. In both the PROPFIND and the PROPPATCH case, the client provides an XML document to the server that describes the set of properties the server should act on. Similarly, in both cases, the server's response to a PROPFIND or a PROPPATCH invocation is an XML document that contains the values of properties requested, information about the success or failure of the request, or a combination of both types of data.

In one embodiment of this invention, a request object is specialized to generate the XML document associated with a PROPFIND request. In another embodiment, a request object is specialized to generate the XML document associated with a PROPPATCH request. In both the PROPFIND and PROPPATCH embodiments, the request object accumulates information that pertains to the different properties that are associated with the namespaces that are to appear in the XML document. For example, the client might be interested in a set of properties that are associated with a first namespace, and a completely different set of properties that are associated with a second namespace. These properties are provided to the request object through calls that are made by the client to the object. The calls preferably specify a namespace of interest by using its assigned moniker and associating with the moniker the properties of interest.

The specified properties are maintained in a data structure that organizes the properties and the prefixes that are associated with the namespace to which the property pertains. In the described embodiments, data structures can be defined for adding new properties (such as in a PROPFIND request) or for modifying property values of existing properties (such as in a PROPPATCH request).

Thus, a collection of namespaces, associated prefixes, and associated properties is defined prior to building the XML document. The data structures are flat structures or tables that are much different from the hierarchical tree structures that are utilized in the prior art. Once all of the information has been collected by the request object, it can be rendered into an XML document by calling a rendering method in the request object. The XML document is sent as a data stream to an appropriate server for processing.

Exemplary Computer System

Figure 3:
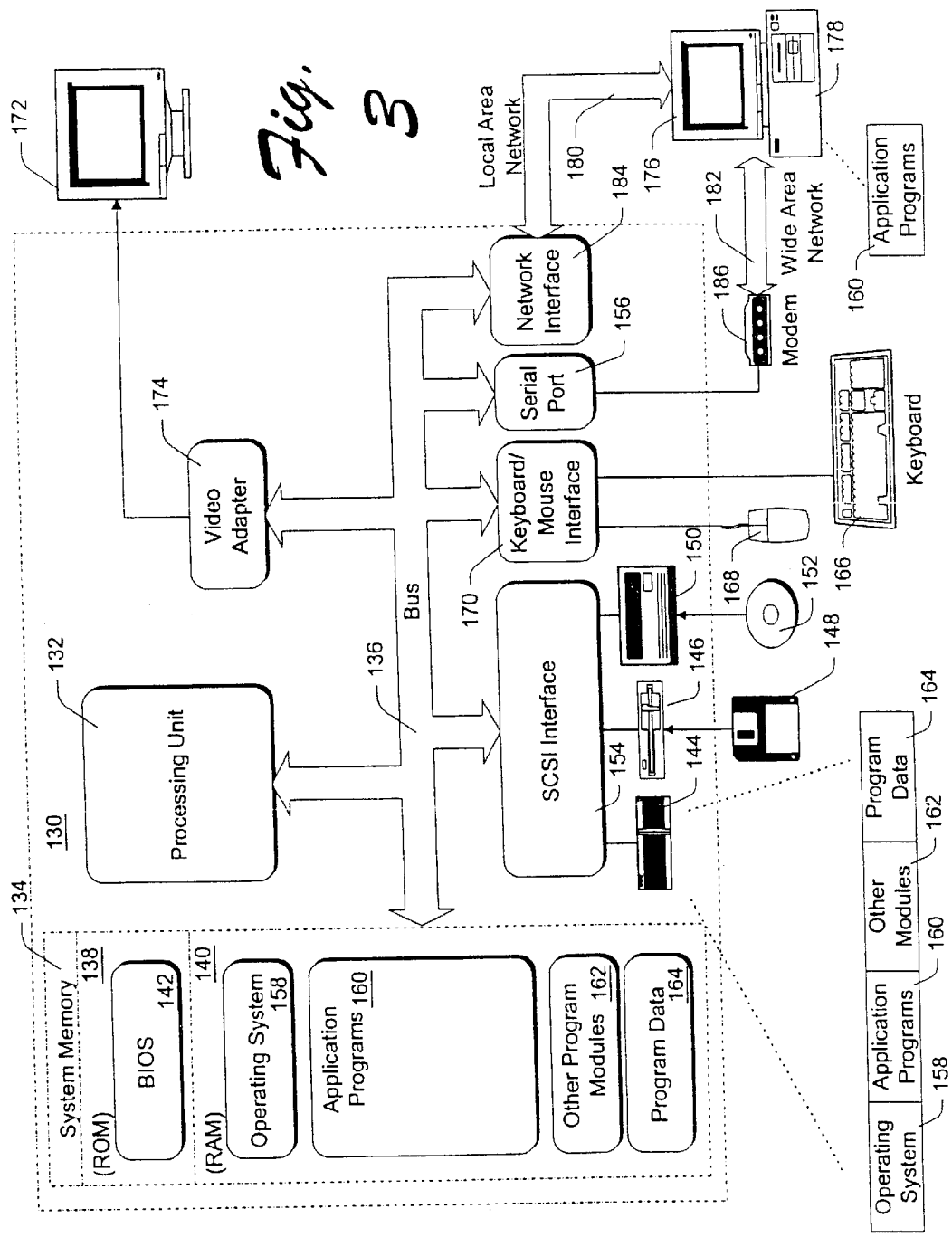
FIG. 3 is a computer system that is suitable for use in implementing embodiments of the invention.

FIG. 3 shows a general example of a computer 130 that can be used in accordance with the invention. Various numbers of computers such as that shown can be used in the context of a distributed computing environment.

Computer 130 includes one or more processors or processing units 132, a system memory 134, and a bus 136 that couples various system components including the system memory 134 to processors 132. The bus 136 represents one or more of any of several types of bus structures, including a memory bus or memory controller, a peripheral bus, an accelerated graphics port, and a processor or local bus using any of a variety of bus architectures. The system memory 134 includes read only memory (ROM) 138 and random access memory (RAM) 140. A basic input/output system (BIOS) 142, containing the basic routines that help to transfer information between elements within computer 130, such as during start-up, is stored in ROM 138.

Computer 130 further includes a hard disk drive 144 for reading from and writing to a hard disk (not shown), a magnetic disk drive 146 for reading from and writing to a removable magnetic disk 148, and an optical disk drive 150 for reading from or writing to a removable optical disk 152 such as a CD ROM or other optical media. The hard disk drive 144, magnetic disk drive 146, and optical disk drive 150 are connected to the bus 136 by an SCSI interface 154 or some other appropriate interface. The drives and their associated computer-readable media provide nonvolatile storage of computer-readable instructions, data structures, program modules and other data for computer 130. Although the exemplary environment described herein employs a hard disk, a removable magnetic disk 148 and a removable optical disk 152, it should be appreciated by those skilled in the art that other types of computer-readable media which can store data that is accessible by a computer, such as magnetic cassettes, flash memory cards, digital video disks, random access memories (RAMs), read only memories (ROMs), and the like, may also be used in the exemplary operating environment.

A number of program modules may be stored on the hard disk 144, magnetic disk 148, optical disk 152, ROM 138, or RAM 140, including an operating system 158, one or more application programs 160, other program modules 162, and program data 164. A user may enter commands and information into computer 130 through input devices such as a keyboard 166 and a pointing device 168. Other input devices (not shown) may include a microphone, joystick, game pad, satellite dish, scanner, or the like. These and other input devices are connected to the processing unit 132 through an interface 170 that is coupled to the bus 136. A monitor 172 or other type of display device is also connected to the bus 136 via an interface, such as a video adapter 174. In addition to the monitor, personal computers typically include other peripheral output devices (not shown) such as speakers and printers.

Computer 130 commonly operates in a networked environment using logical connections to one or more remote computers, such as a remote computer 176. The remote computer 176 may be another personal computer, a server, a router, a network PC, a peer device or other common network node, and typically includes many or all of the elements described above relative to computer 130, although only a memory storage device 178 has been illustrated in FIG. 3. The logical connections depicted in FIG. 3 include a local area network (LAN) 180 and a wide area network (WAN) 182. Such networking environments are commonplace in offices, enterprise-wide computer networks, intranets, and the Internet.

When used in a LAN networking environment, computer 130 is connected to the local network 180 through a network interface or adapter 184. When used in a WAN networking environment, computer 130 typically includes a modem 186 or other means for establishing communications over the wide area network 182, such as the Internet. The modem 186, which may be internal or external, is connected to the bus 136 via a serial port interface 156. In a networked environment, program modules depicted relative to the personal computer 130, or portions thereof, may be stored in the remote memory storage device. It will be appreciated that the network connections shown are exemplary and other means of establishing a communications link between the computers may be used.

Generally, the data processors of computer 130 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the steps described below in conjunction with a microprocessor or other data processor. The invention also includes the computer itself when programmed according to the methods and techniques described below.

For purposes of illustration, programs and other executable program components such as the operating system are illustrated herein as discrete blocks, although it is recognized that such programs and components reside at various times in different storage components of the computer, and are executed by the data processor(s) of the computer.

Exemplary Architecture

Figure 4:
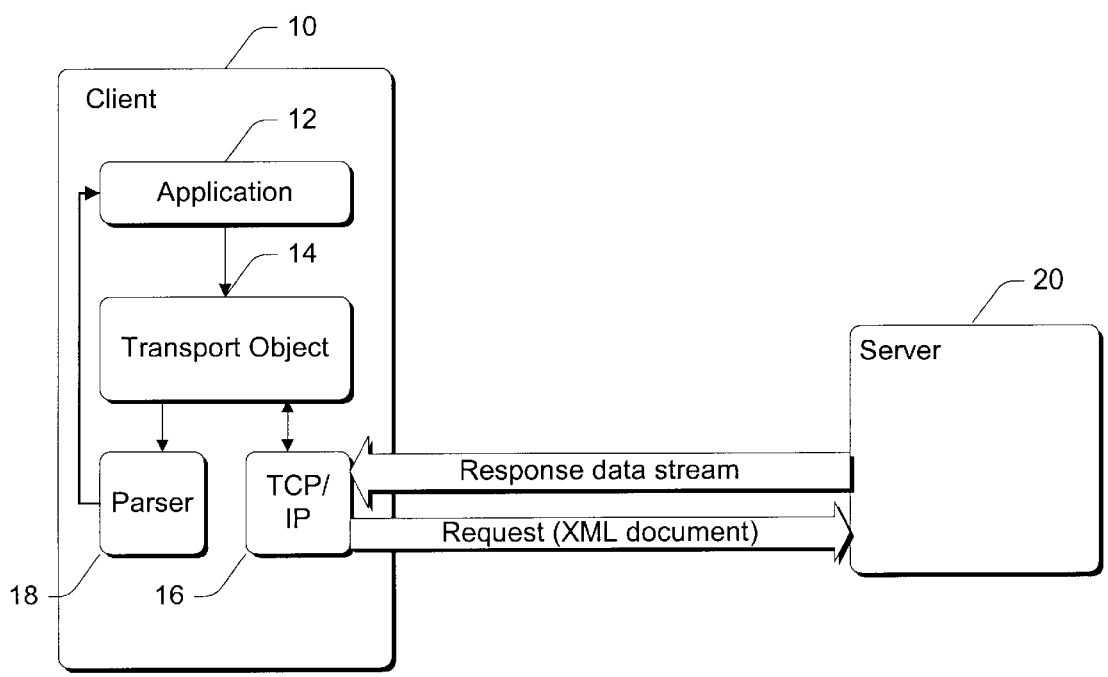
FIG. 4 is a block diagram that shows an exemplary client/server architecture in accordance with an embodiment of the invention.

FIG. 4 shows an example of an architecture that is suitable for use in connection with various embodiments of the invention. In this architecture, a client 10 includes a software application 12, a transport object 14, a TCP/IP module 16 and a parser 18. Although these components are shown as being grouped within the client 10, they can be implemented apart from client to application 12. An exemplary client or application is one that generates requests for XML data and receives responses to its requests in the form of XML data streams. One specific example of an application is Microsoft's Outlook Express.

Transport object 14 is a program module that is used in connection with sending and receiving XML documents. In the described embodiment, the transport object is a Distributed Authoring and Versioning (WebDAV) transport object that is designed to work in connection with DAV requests and responses. Specific examples of these are given below. In operation, application 12 typically generates a request that is sent through the transport object 14 and the TCP/IP module 16 to a server 20. The server receives the request, processes it, and returns an XML data stream to the client. The XML data is received into the TCP/IP module 16 and the transport object 14. The transport object 14 then begins pushing the data into the parser 18. The parser 18 then begins to operate on the XML data stream by parsing it and providing the resulting data to the application 12. In this example, parser 18 is a so-called "push-model" parser because XML data is pushed into it by the transport object 14. Aspects described below are associated with the processing that takes place to build the XML request that is sent by the client or application 12 to the server 20.

Process Overview

Figure 5:
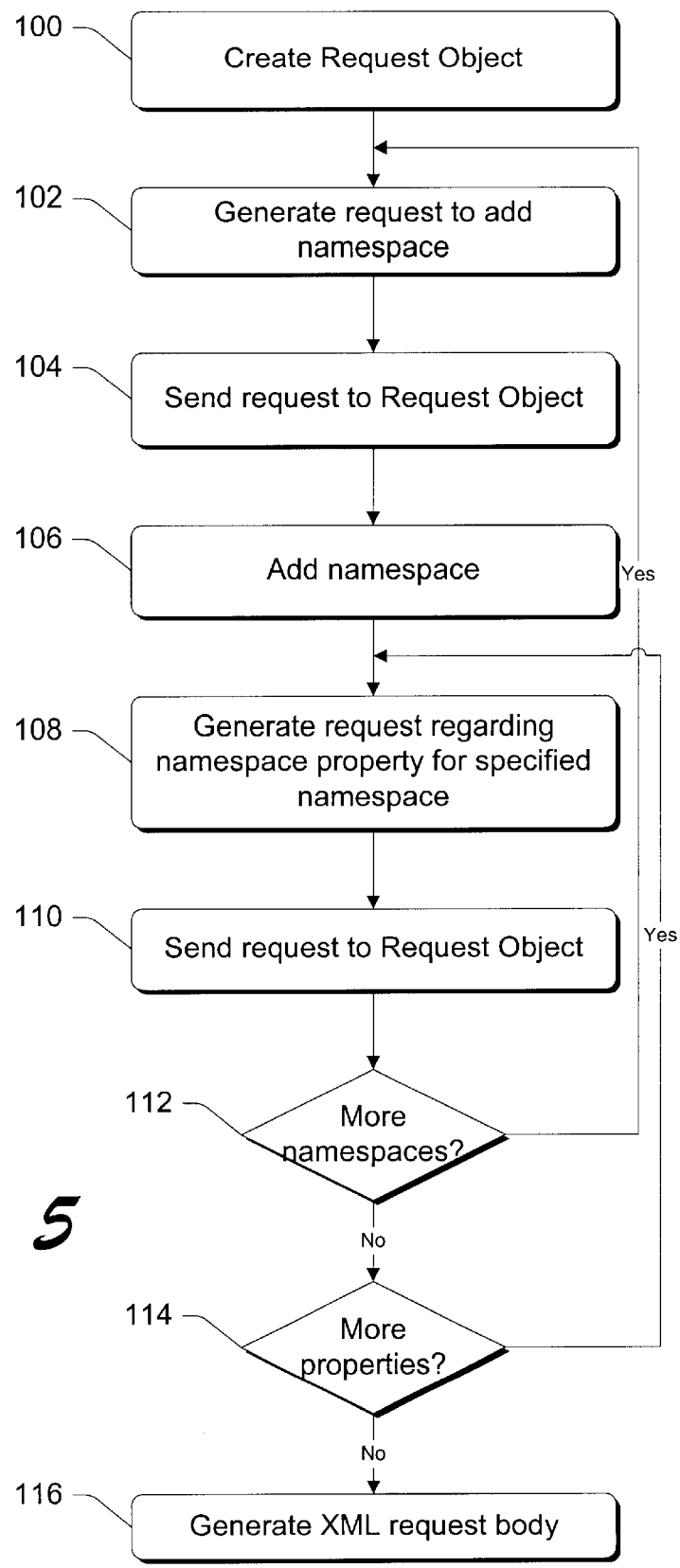
FIG. 5 is a flow diagram that describes steps in a method in accordance with one embodiment of the invention.

FIG. 5 shows a flow diagram that describes exemplary steps for generating an XML document. In this example, the request object is a C++ object and the client or application has the ability to generate a request by making a series of calls into an application programming interface (API) of the request object. The series of calls include those that are associated with adding one or more namespaces and one or more properties that are associated with the namespaces. This enables the request to be represented as an abstract collection of namespaces and properties within those namespaces. Finally, when all of the namespaces and their associated properties have been collected, the client makes a single call to the request object which then generates a well-formed XML document that incorporates the namespaces and their associated properties.

Referring now specifically to FIG. 5, step 100 creates or instantiates a request object. The request object can be created by the application (see FIG. 2) when it wants to build an XML document. Step 102 generates a request to add a namespace that will ultimately appear in the XML document that is to be built by the request object. Here, the application generates the request. Step 104 sends the application's request to the request object. Where the request object is a C++ object, step 104 is implemented by the application by calling an interface in the request object that has a method for adding a namespace. Step 106 adds the namespace that is specified by the client. Here, the request object (FIG. 2) adds the namespace. Step 108 generates a request regarding a namespace property for a specified namespace. This request is generated by the application. Step 110 sends the application's request regarding the namespace property to the request object. This is accomplished by calling an interface in the request object that has a method operating upon the specified property. In the example that is given below, properties can be added, or property values can be modified. Step 112 checks to see whether there are any additional namespaces to be added to the document. If there are, the method loops back to step 102. If there are no additional namespaces to be added, step 114 checks to see whether there are any additional properties that are to be added to the document. If there are, then the method loops back to step 108. If there are not, then the request object generates (step 116) the XML document. The XML document is generated after all of the namespaces and their associated properties are collected by the request object. Where the request object is implemented as a C++ object, such is accomplished by calling an API in the request object that has a method that uses the collected information and processes it into the XML document.

Request Object

Figure 6:
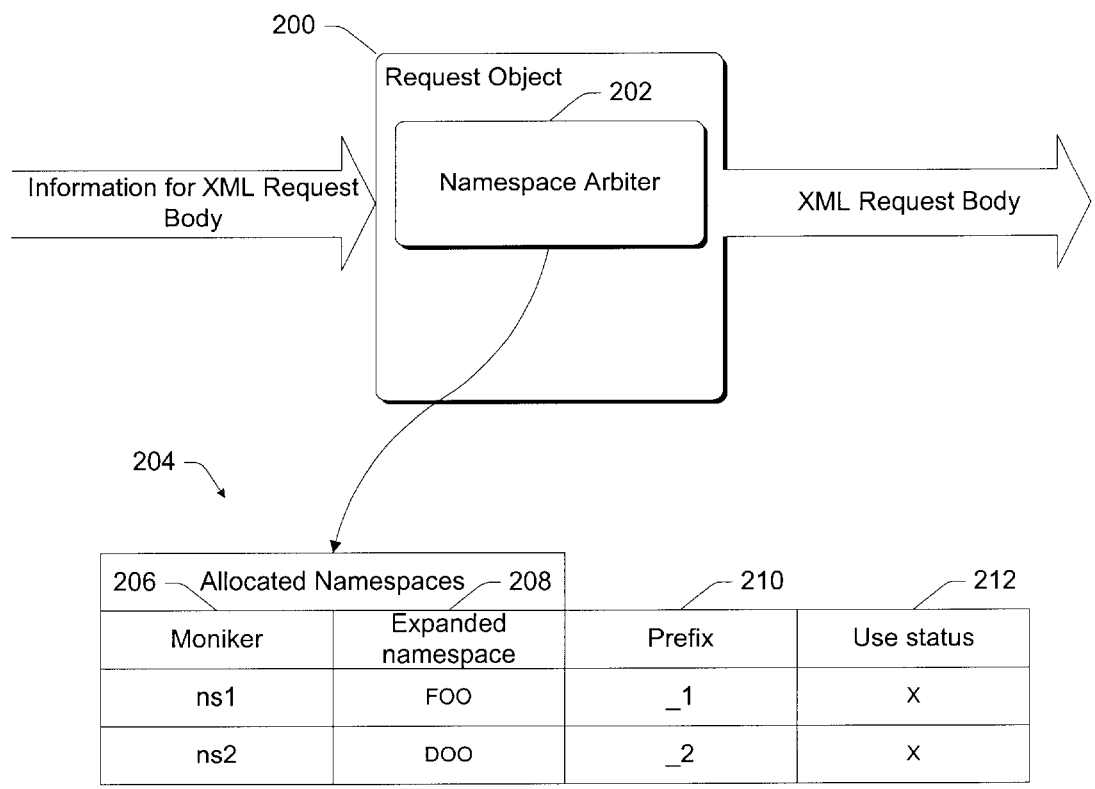
FIG. 6 is a conceptual diagram of a request object in accordance with one embodiment of the invention.

In the described embodiment, the request object is a C++ object that collects information that is provided by the client, and renders it into an XML document. FIG. 6 shows an exemplary request object 200 that has been instantiated by a client application that is in the process of creating an XML document. One of the functions of the request object 200 is to receive information from the client and organize the information so that it can later be used to generate the appropriate XML document. One of the ways that the request object 200 can do this is through the use of a namespace arbiter object 202. Another of the ways request object 200 can do this is through the use of other objects that manage and organize properties that are to be incorporated into the document.

Namespace Arbiter Object

One of the functions of the namespace arbiter object 202 is to manage a collection 204 of allocated namespaces. Collection 204 defines a data structure that is used to manage and organize the namespaces or namespace values that are specified by a client in the client's request to the request object 200. Collection 204 has a plurality of fields that include a moniker field portion 206, an expanded namespace field portion 208, a prefix field portion 210, and a use status portion 212. The moniker field portion 206 holds a moniker that is assigned to each namespace that is to be added to the document. The expanded namespace field portion 208 holds the expanded namespace name value that is specified by the client, the prefix field portion 210 holds a prefix that is assigned by the request object 200 to the specified namespace, and the use status field portion 212 holds a value that indicates whether a prefix or namespace is in use. The latter field is used in connection with legacy applications in which prefixes and namespaces are reserved or predefined. This is discussed in more detail below.

One of the first things that happens when a client builds an XML document is that it specifies the namespaces that are to appear in the XML document. This corresponds to steps 102 and 104 in FIG. 5. When the request object 200 receives such a request, namespace arbiter 202 creates a new entry in collection 204, produces a moniker (similar to a handle) that is associated with the namespace that is specified by the client, and returns the moniker to the client. The client can then use the moniker when making additional calls to the request object 200 that are associated with the associated namespace's properties. For example, consider that the client wants to add the namespaces "FOO" and "DOO" to an XML document. The client would first specify "FOO" in a call to the request object 200. This might take the following form:

request object→Addnamespace ("FOO"), where "Addnamespace" is a method in the request object 200 for adding a namespace. Responsive to receiving the request, the namespace arbiter 202 creates a moniker, here "ns1", and returns it to the client. Additionally, the prefix "_1" is assigned to the "FOO" namespace. At this point, with the moniker having been returned to the client, the client is free to provide information that will be used to add properties or to change property values in the XML document. Alternately, the client can request to add another namespace. In this example, the client has added another namespace "DOO". Accordingly, when the client request is received, another entry is allocated in collection 204 and a moniker "ns2" is assigned to the "DOO" namespace and returned to the client. A prefix "_2" is also assigned to the "DOO" namespace. The purpose for the prefixes will become apparent below. Preliminarily, however, the prefixes assist in so-called namespace aggregation which is a way of representing fully expanded namespaces in a manner that reduces the text that ultimately appears in the XML document.

Property Management Objects

The request object can make use of other objects to assist in generating an XML document. In one specific example, such other objects comprise so-called property management objects. The property management objects are very specific types of objects that are used in connection with WebDAV requests. Accordingly, it will be appreciated that objects other that property management objects can be utilized to assist the namespace arbiter. The various property management objects are used to organize and manage properties that are associated with the namespaces that are managed by the namespace arbiter. The property management objects come into play when a client adds a property or desires to change a property value that is associated with a particular property. In order to do so, the client calls an appropriate method in the request object and specifies both the moniker that is associated with the namespace of interest, and the property that is associated with that namespace.

Property Collection Object

Figure 7:
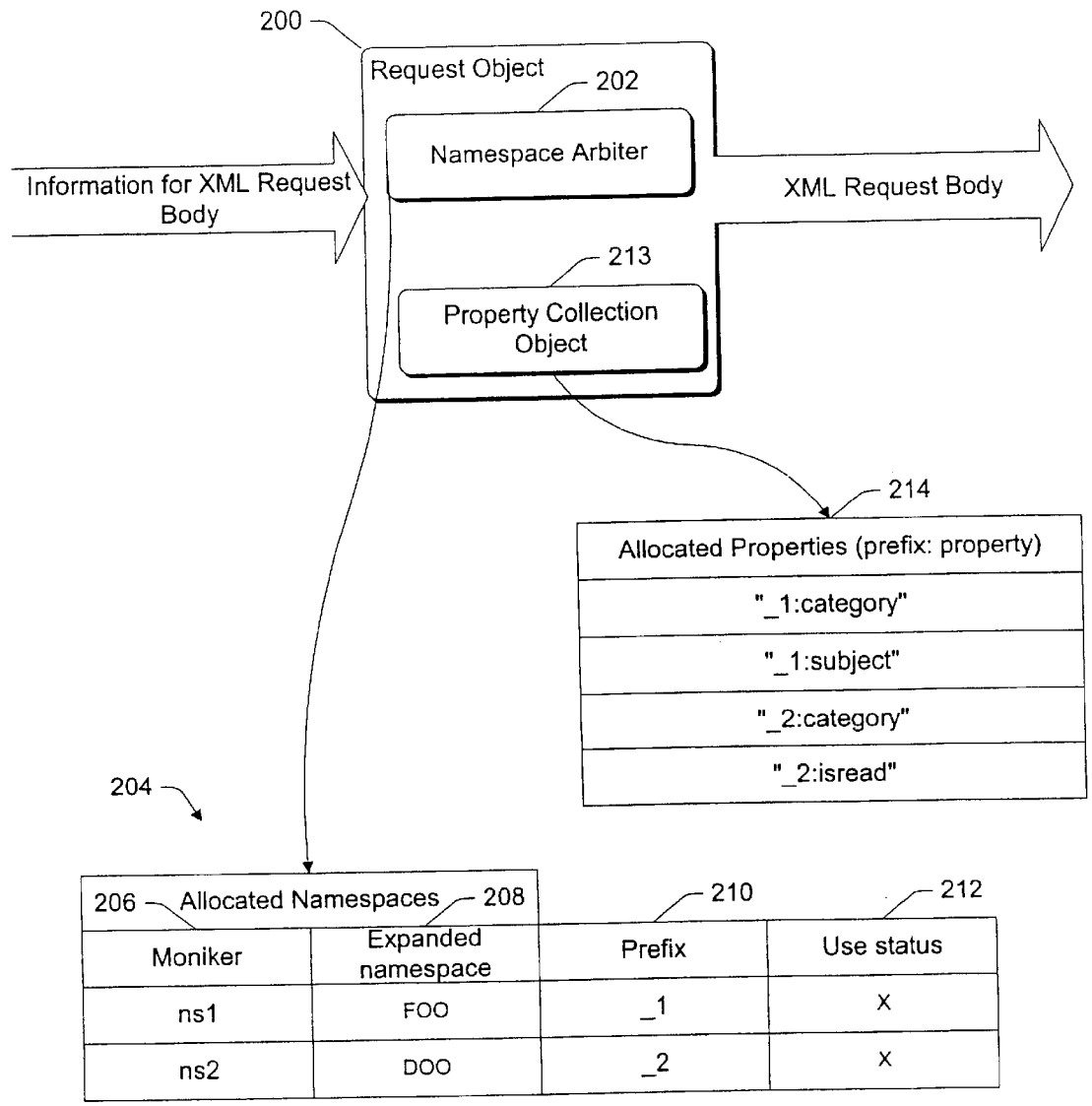
FIG. 7 is a conceptual diagram of a request object in accordance with one embodiment of the invention.

FIG. 7 shows a property collection object 213 that enables properties to be added that are to be included in the XML document in the PROPFIND embodiment. An exemplary call to the request object 200 might have the form:

request object→AddProperty(ns1, "category")

request object→AddProperty(ns1, "subject").

Here, the "ns1" moniker is used in the argument to designate the "FOO" namespace. In this example, two properties are being added for the "FOO" namespace—"category" and "subject". When the "AddProperty" methods are called, property collection object 213 takes the "ns1" moniker and looks up the assigned prefix for that moniker in collection 204 that is managed by the namespace arbiter 202. An entry is then made in an allocated properties collection 214. In this example, the entry is a data configuration that associates the prefix ascertained from collection 204 and the property or properties with which it is associated. This data configuration is later incorporated directly into the XML document. Accordingly, in this example, two entries are made in the allocated properties collection 214—namely "_1:category" and "_1:subject". Similarly, the properties "category" and "isread" can be added for the "DOO" namespace by making the following calls in the request object 200:

request object→AddProperty(ns2, "category")

request object→AddProperty(ns2, "isread").

Here, the property collection object 213 uses the specified moniker "ns2" to look up the prefix in collection 204 that is assigned to the "DOO" namespace. Finding the "_2" prefix, the property collection object 213 then makes appropriate entries in the allocated properties collection 214 to reflect that these properties have been added. In this example, two more entries have been added-namely "_2:category" and "_2:isread".

Upon completion of the above processing, all of the information that is necessary to generate an XML document has been collected and organized by the request object 200. First, all of the namespaces or namespace values have been specified and assigned unique prefixes. The unique prefixes have been used to build a collection of properties that are to appear in the XML document. In this manner, all of the namespaces have been coalesed in that they never have to appear in the XML document more than once. Specifically, and using the example above, with the prefixes having been assigned to the expanded namespaces, when XML namespace declarations are made in the XML document, they can be in the form "xmlns:_1=FOO", and "xmlns:_2=DOO" for the "FOO" and "DOO" namespaces respectively. Likewise, when the XML document is generated for the property tags that specify the properties that were added by the client, the entries from the allocated properties collection 214 can be used, i.e. "_1:category", "_1:subject", "_2:category", and "_2:isread" and directly incorporated into the XML document.

Add/Remove Property Object

Figure 8:
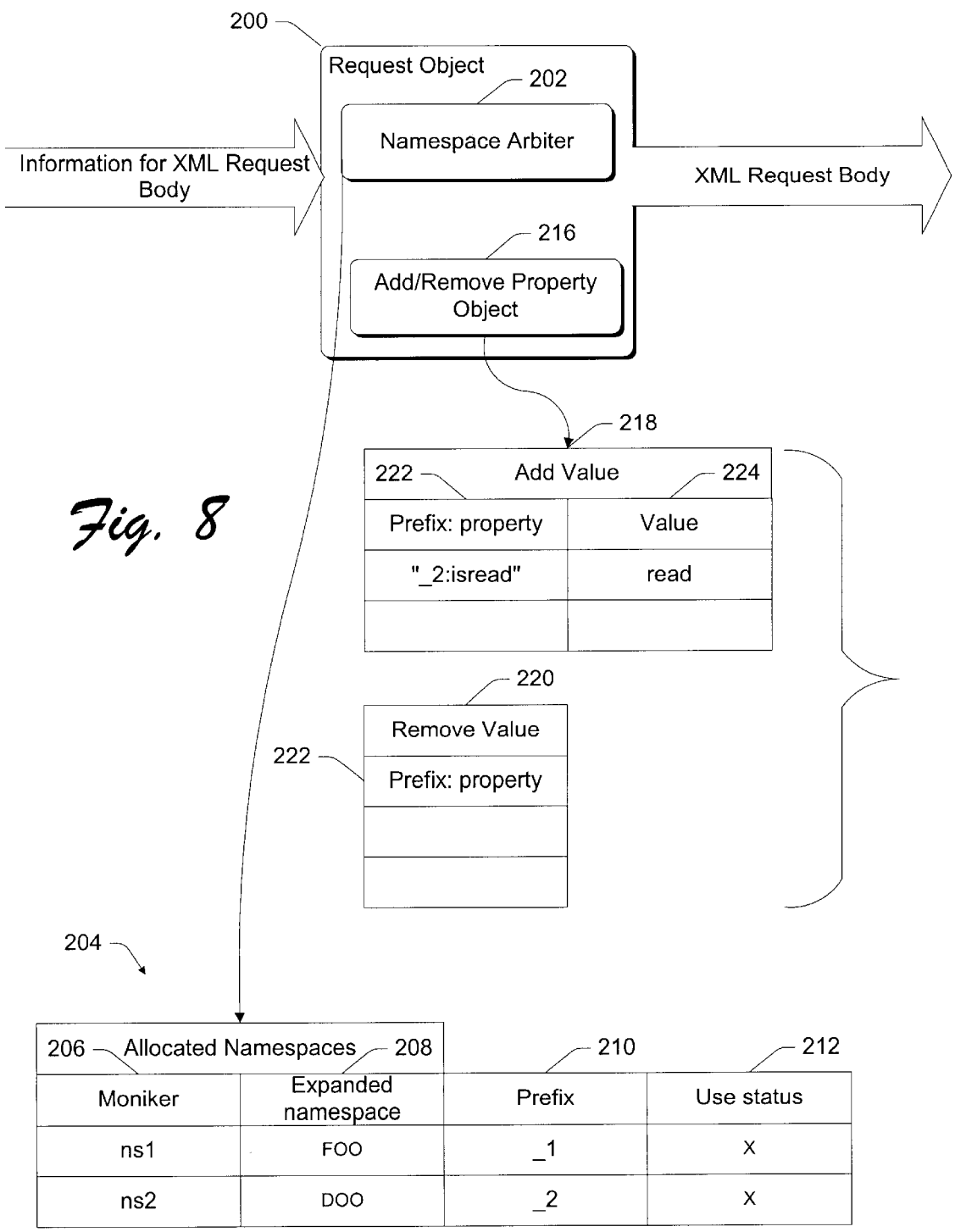
FIG. 8 is a conceptual diagram of a request object in accordance with one embodiment of the invention.

FIG. 8 shows an add/remove property object 216 that is used when a property value is to be modified. Property values can be changed by adding a value or removing a value. The add/remove property object 216 organizes information that is provided by the client so that the information can then be rendered into an XML document. In this example, it does so through the use of two data structures shown as an add value collection 218 and a remove value collection 220. The collection 218220 has two fields—a "prefix:property" field 222, and a value field 224. The "prefix:property" field holds a data configuration that is associated with the prefix (ascertained from collection 204) and the property that is associated with the prefix. The value field 224 holds a new value or outcome value that is used to modify the current property value. The collection 220 has one field—a "prefix:property" field 222. When a client desires to change the value of a property, it calls an appropriate method in the request object to do so. As an example, consider that a client may want to change the "isread" property of the "DOO" namespace from "not read" to "read". The appropriate call to the request object 200 might take the following form:

request object→ChangePropValue (ns2, "isread", read).

Here, the moniker "ns2" in the argument identifies the namespace "DOO" and the "isread" designates the "isread" property for the "DOO" namespace. The "read" is the value that is to replace the current value for the "isread" property in the "DOO" namespace. When this method is called, the add/remove property object 216 takes the "ns2" moniker and searches the allocated namespaces collection 204 to find the prefix that is associated with that moniker. In this case, the prefix "_2" is found for the "DOO" namespace. When the prefix is ascertained, an entry is made in the appropriate collection (either 218 or 220). The form of the entry is shown in FIG. 8 for the example given above. There, the "prefix:property" field 222 holds the entry "_2:isread" which designates the "isread" property for the namespace that is associated with the prefix "_2"—here the "DOO" namespace. The value field 224 holds the value "read" which is to replace the current value of the "isread" property for the "DOO" namespace.

Thus, in this manner, generation of the XML document has not required a hierarchical tree to be built. Rather, flat data structures or lists which, in some instances can simply be tables, are used to pre-organize, format, and manage the information that is provided by the client that is to ultimately end up in the XML document. This results in substantial saving insofar as memory overhead and consumption is concerned. In addition, XML documents can be more quickly generated because of the processing time reductions that are associated with less memory overhead.

Legacy Support

Legacy support can also be provided by defining a set of known namespaces for which there are specified, defined prefixes. The reason for this is to support legacy servers that have taken some shortcuts in implementation. Specifically, some legacy servers have eliminated the need to do any namespace mapping operations by specifically assigning certain prefixes to certain namespaces. Then, when a certain defined prefix is used, by convention, the associated namespace can be inferred. Without addressing these legacy issues, a reserved namespace or prefix might be adopted inadvertently. Additionally, legacy servers would be unable to parse the XML document sent by the client, since they would not understand the namespace prefixes used.

FIG. 9 shows an expansion of the allocated namespace collection 204 that is managed and organized by namespace arbiter 202. In this collection 204 there are five rows that are designated as "reserved". These rows include the expanded namespaces of the reserved or predefined namespaces (expanded namespace field 208) and their associated reserved or predefined prefixes (prefix field 210). In the specifically illustrated example, the reserved namespaces and prefixes are those that have been reserved for use in connection with Microsoft's Outlook Express and Hotmail products which are described in more detail below. The use status field 212 also contains a value that indicates whether the specifically reserved namespaces have been designated for inclusion in the document. In this example, a Boolean value (either true or false) is used to designate the use status. If a "T" appears in this column, then the namespace and associated prefix are to be included in the document. In this example, the "DAV" namespace has been designated for use in the document.

Outlook Express and Hotmail XML Documents

In one implementation, generation of XML documents take place in connection with Microsoft's Outlook Express and Hotmail products. Briefly, Hotmail is an email delivery system that concentrates most or all of the email functionality on the server side and not the client side. Hotmail is accessible by either a web browser, such as Microsoft Internet Explorer, or by mail clients that understand a specific version of the WebDAV protocol. Microsoft Outlook Express is a mail client that has been designed to use WebDAV to enable access to email via WebDAV. The Hotmail system makes use of an array of web servers. When a user logs in, they communicate with one of the servers of the array. The web servers are configured to serve web pages or, in the case of WebDAV, to serve XML documents, and do not contain any user data. The web servers can either pull HTML files off a storage disk, run a program to generate an appropriate HTML file, pull an XML file off of a storage disk, or run a program to generate an XML file. The file is then provided to a user browser or email client executing on a user machine that requested the HTML or XML file and is assembled by the browser or email client at the user machine.

The Hotmail system also includes one or more user database servers. All user or recipient data resides on these user database servers. This includes, for each account, all email messages, contact lists, personal preferences, passwords, and all other items typically associated with an email account. In practice, the user database servers are implemented by SUN Ultra Enterprise 4500-class servers. Each server stores from between 750,000 to 2,000,000 user accounts.

An internal database server is provided and includes a list of all Hotmail users in memory, as well as the location of their user data on the user database servers. When a user contacts the Hotmail system, a web server of the web server array contacts internal database server to ascertain the location of the user's data on one of the user databases servers. The internal database server returns the location to the web server which then can either assist a user in retrieving their email messages or assist a user in sending email messages.

When an email message is read by a user who is using a web browser, the list of email messages are pulled by a web server or web server array. An appropriate web page is generated to appear as an email inbox. Links are embedded in the web page for the particular email messages. The web page is then sent to the user and assembled by the user's browser. The links retrieve the particular email messages for a user.

When email is sent, a user clicks on an appropriate composition page which brings up a web page that looks like an email page. The user types a message and clicks send. The email message is packaged as an http web request that is received by a server of the server array. The web server then contacts the internal database server to ascertain the location of the intended recipient. If the recipient exists, then their location is returned to the web server which then deposits the email message in the appropriate account. This process is utilized for the users that are within the Hotmail system. That is, these users are subscribers to the Hotmail email service. Email messages can, however, be received into the Hotmail system from outside of the system.

To address this situation, the Hotmail system also includes an array of SMTP mail servers that perform essentially the same as the server array mentioned above. That is, when an email message is received from outside of the system, a server of SMTP mail server array contacts the internal database server to ascertain a recipient location among the user databases, and then deposits the email message at one or more of the appropriate locations.

In the context of the Hotmail system, consider again FIG. 4. In this example, application 12 comprises an email program such as Microsoft's Outlook Express and server 20 comprises the Hotmail system. Unlike a web browser, which communicates with Hotmail using HTTP and HTML, Outlook Express communicates with Hotmail using WebDAV. When a user clicks on an appropriate folder in their email directory, the application 12 detects the click on the folder and knows from a previous session that the folder maps to a specific URL on the server 20. For that folder, there is a valid URL that contains all of the mail messages in the folder. By clicking on the folder, the user enables the application 12 to build an appropriate XML request (here, a PROPFIND request) that gets sent the server that requests all of the messages in the folder and their properties. Example properties include the subject, date, from, read, attachments and the like. The application 12 builds a list of the mail that may not contain the actual messages. A user selects a message to be read by double clicking on the displayed list. This tells the application to generate a request asking for the body of the message. The message body is then sent to the user and can be stored for later reading. Double clicking on the message also serves to enable the application 12 to check to see whether the message is unread. That is, the application 12 checks the "read" property of the message. If the message is unread, then the application 12 must change the "read" property from unread to read. It does this by generating an appropriate XML request (here a PROPPATCH request) that is sent to the server so that the server can change the message's "read" property.

It is to be understood that use of the inventive request-generating techniques are not to be limited to the Microsoft's Outlook Express and Hotmail products. Specifically, techniques of the various embodiments can be used in connection with generating any suitable XML data without departing from the spirit and scope of the invention.

Use of the PROPFIND and PROPPATCH DAV Commands

One of the areas of application within Microsoft's Outlook Express and Hotmail products is the use of WebDAV commands in the XML documents that are generated. WebDAV is an extension to the HTTP/1.1 protocol that allows clients to perform remote web content authoring operations. This extension provides a coherent set of methods, headers, request entity body formats, and response entity body formats that provide operations for properties and collections.

For properties, WebDAV gives the ability to create, remove, and query information about Web pages, such as their authors, creation dates, etc. Also, WebDAV gives the ability to link pages of any media type to related pages. For collections, WebDAV gives the ability to create sets of documents and to retrieve a hierarchical membership listing (like a directory listing in a file system). Many articles have been written on WebDAV. For further information, the reader is referred to the following articles: "WEBDAV: IETF Standard for Collaborative Authoring on the Web" authored by Whitehead and Wiggins, and appearing in the September/October 1998 issue of *IEEE Internet Computing*; and "Distributed Authoring and Versioning", authored by Kaiser and Whitehead, and appearing in the March/April 1997 issue of *IEEE Internet Computing*.

Two pertinent WebDAV commands or methods are the PROPFIND and PROPPATCH commands. The PROPFIND command or method retrieves properties that are defined on a resource identified by the request-URI. A URI (Uniform Resource Identifier) is a compact string of characters for identifying an abstract or physical resource, if the resource does not have any internal members, or on the resource identified by the request URI and potentially its member resources, if the resource is a collection that has internal member URIs. A client can submit a PROPFIND XML element in the body of the request methods that describes what information is being requested. It is possible to request particular property values, all property values, or a list of the names of the resource's properties. The PROPPATCH command or method processes instructions specified in the document to set and/or remove properties defined on the resource identified by the request-URI.

Generating an XML Document

In one implementation, the PROPFIND request is expressed as a C++ object with "public" methods that are invoked by its clients. The public application programming interface (API) of the PROPFIND object is as follows:

```
class CPropFindRequest
{
    HRESULT AddNamespace(LPCSTR pszNamespace, DWORD
        *pdwNsId);
    HRESULT GetNamespaceId(LPCSTR pszNamespace, DWORD
*pdwNsId);
    HRESULT GetNamespacePrefix(DWORD dwNsId, LPSTR
*ppszNsPrefix);
    HRESULT AddProperty(DWORD dwNsId, LPCSTR pszPropName);
    HRESULT GenerateXML(LPSTR *ppszXML);
};
```

The client of the CPropFindRequest object makes a series of calls to AddNamespace to add all of the namespaces that will appear in the request. Each namespace is assigned an arbitrary "ID". The client then adds the properties that will appear in the request, and includes the associated namespace ID each time a property is added. An exemplary arbitrary ID is the moniker discussed above.

In addition, the PROPPATCH request object is similar to the PROPEIND object but differs slightly:

```
class CPropPatchRequest
{
    HRESULT AddNamespace(LPCSTR pszNamespace, DWORD
*pdwNsId);
    HRESULT GetNamespaceId(LPCSTR pszNamespace, DWORD
*pdwNsId);
    HRESULT GetNamespacePrefix(DWORD dwNsId, LPSTR
*ppszNsPrefix);
    HRESULT SetProperty(DWORD dwNsId, LPCSTR pszPropName,
LPCSTR pszPropValue);
    HRESULT RemoveProperty(DWORD dwNsId, LPCSTR
pszPropName);
    HRESULT GenerateXML(LPSTR *ppszXML);
};
```

Internally, the PROPFIND and PROPPATCH request objects use an instance of the namespace arbiter 202—here "CDAVNamespaceArbiter" to manage the namespaces. The API for the "CDAVNamespaceArbiter" is as follows:

```
Class CDavNamespaceArbiter
{
    HRESULT AddNamespace(LPCSTR pszNamespace, DWORD
*pdwNsId);
    HRESULT GetNamespaceId(LPCSTR pszNamespace, DWORD
*pdwNsId);
    HRESULT GetNamespacePrefix(DWORD dwNsId, LPSTR
*ppszNsPrefix);
    LPSTR AllocExpandedName(DWORD dwNsId, LPCSTR
pszPropName);
    HRESULT WriteNamespaces (IStream *pStream);
};
```

Figure 10:
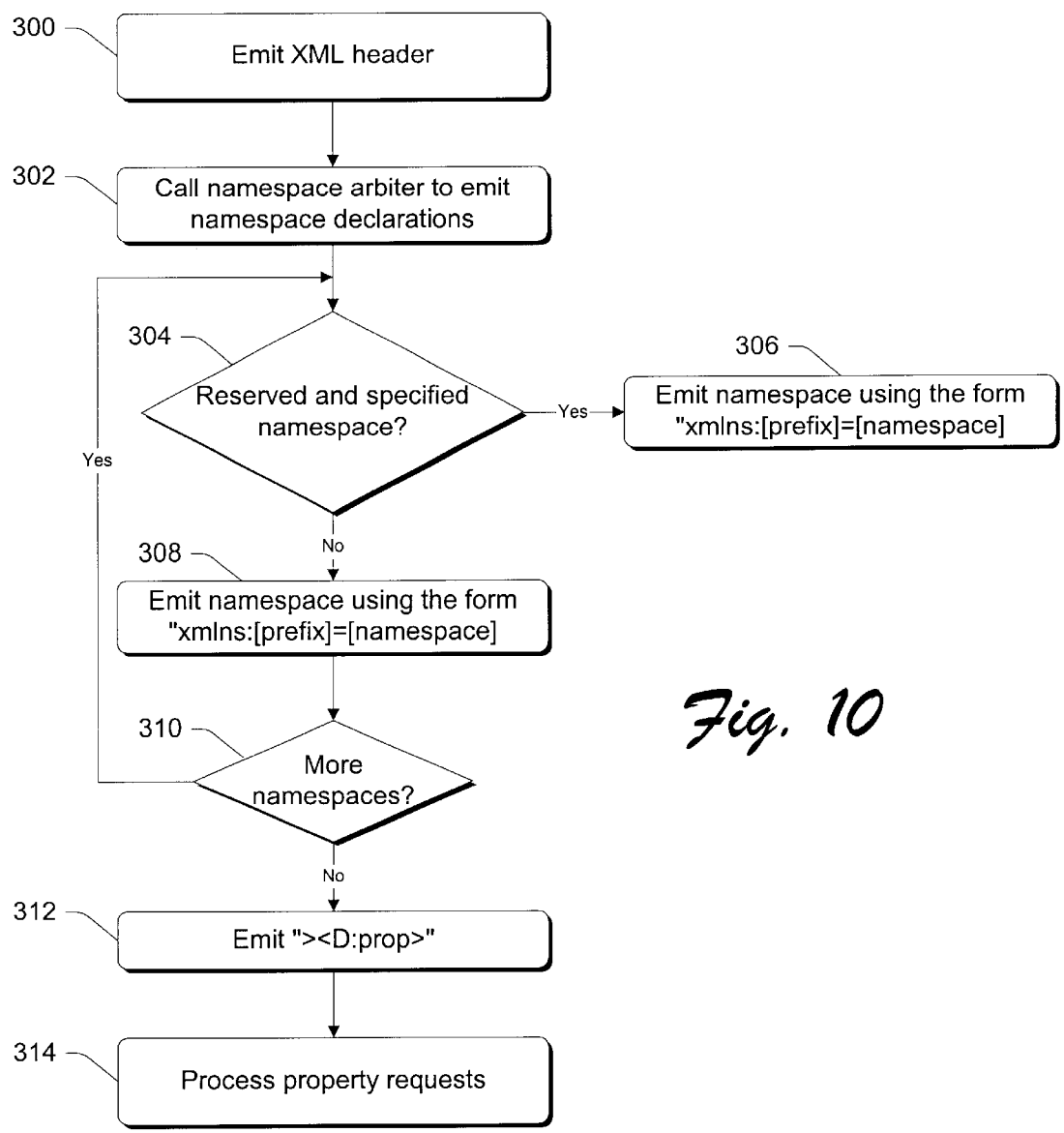
FIG. 10 is a flow diagram that describes steps in a method in accordance with one embodiment of the invention.
Figure 11:
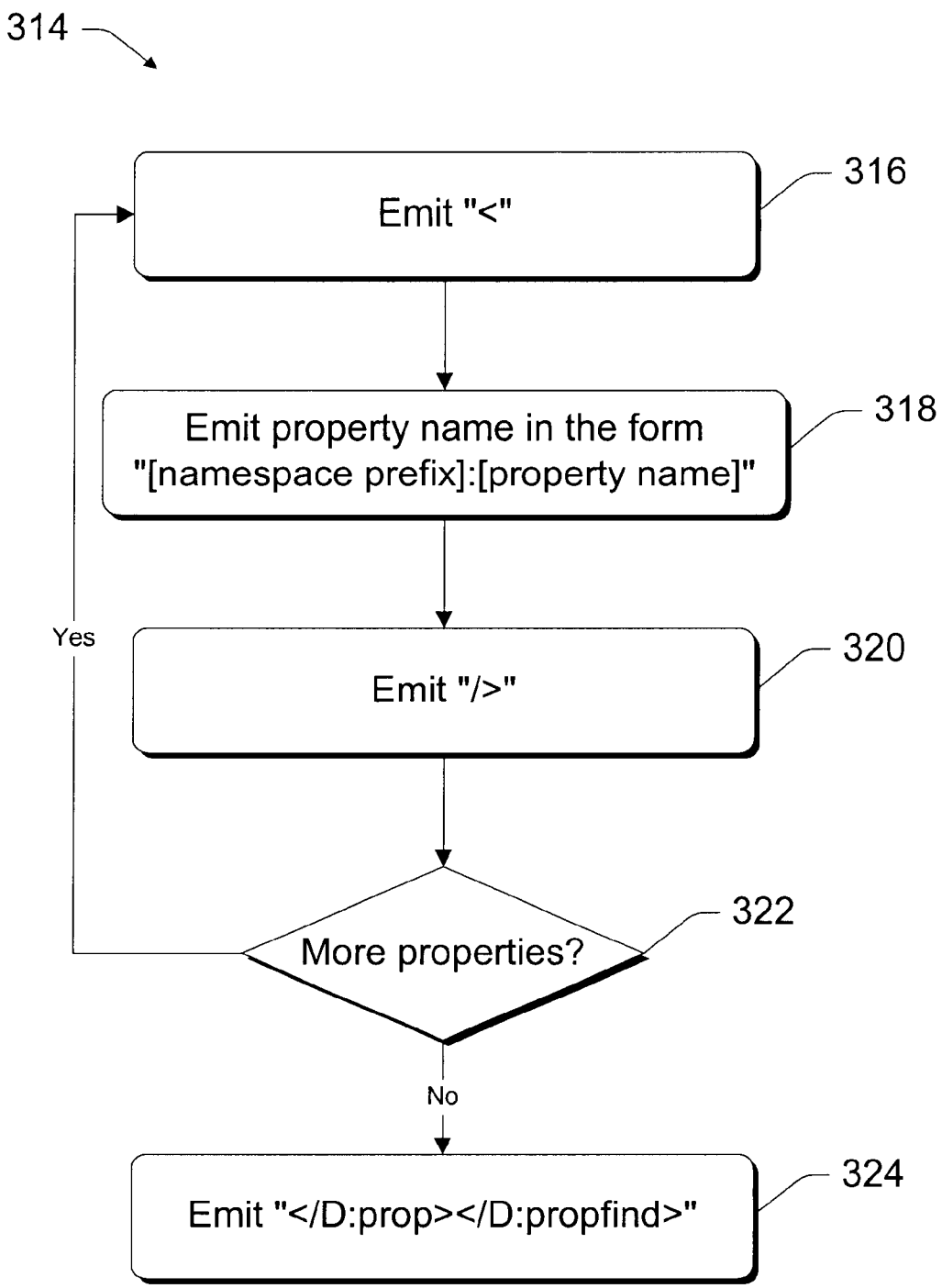
FIG. 11 is a flow diagram that describes steps in a method in accordance with one embodiment of the invention.

The process of generating an XML request body for a PROPFIND request is shown in FIGS. 10 and 11. In this example, a PROPFIND request is going to be generated for the information that was provided by the client and shown in FIGS. 7 and 9.

Step 300 in FIG. 10 emits a so-called boilerplate XML header to an output data stream in the form that is shown below:

"<?xml version="1.0"?>
<D:propfind"

Step 302 calls a method in the namespace arbiter 202 and asks it to emit all of the namespace declarations to the output data stream. Responsive to the step 302 call, the namespace arbiter 202 checks to see whether any of the namespaces that are specified by the client that appear in the allocated namespace collection 204 are reserved (step 304). Recall that certain namespaces are reserved and have predefined prefixes. In this example, and using the allocated namespace collection of FIG. 9, the namespace arbiter would identify the "DAV" namespace as being reserved and specified. It is specified by virtue of the "T" appearing in the use status field 212. All of the other reserved namespaces have an "F" in the use status field indicating that the particular namespaces are not to be included in this particular XML document. Having identified the reserved and specified namespaces, step 306 emits the namespace using the form "xmlns:[prefix]= [namespace]". In this example, the emitted namespace would look as follows:

"xmlns:D="DAV""

If the namespace is not reserved, then step 308 emits the namespace using the same form as that which is specified above. In this example, there are two namespaces that are not reserved, namely "FOO" and "DOO". Thus, these namespaces would be emitted in the same form as the "DAV" namespace:

"xmlns:__1="FOO"
"xmlns:__2="DOO""

Step 310 checks to see whether there are any more namespaces. If there are not, then step 312 emits a "><D:prop>" and step 314 processes the property requests. Processing of the property requests is shown in more detail in FIG. 11. Thus, at this point, the following XML document has been emitted:

```
<?xml version="1.0"?>
<D:propfind
    xmlns:D="DAV"
    xmlns:__1 ="FOO"
    xmlns:__2="DOO">
    <D:prop>
```

FIG. 11 shows the processing that takes place for the property requests generally at 314. Step 316 emits a "<" which delimits the beginning of the property requests. Step 318 emits a property name in the form "[namespace prefix]:[property name]". In the present example, each property that is to be added to the document can be ascertained from the allocated properties collection 214 (FIG. 7). Notice that the properties are already in the prescribed form so that they can be directly emitted to the output data stream. After emitting the first property name (i.e. "__1:category"), step 320 emits a "/>" and step 322 check to see whether there are any more properties. In this example, there are three more properties so the method loops back to step 316. After picking up all of the properties from the allocated properties collection 214, step 324 emits "</D:prop></D:propfind>". The final product of this XML document generation example is as follows:

```
<?xml version="1.0"?>
<D:propfind
    xmlns:D="DAV"
    xmlns:__1 ="FOO"
    xmlns:__2="DOO">
    <D:prop>
        <__1:category/>
        <__1:subject/>
        <__2:category/>
        <__2:isread/>
    </D:prop>
</D:propfind>
```

The processing described above enables an XML document to be generated without the necessity of building and storing a hierarchical tree structure to represent the XML document. In the described embodiment, data is received that describes namespace name values and properties that are to appear in an XML document. The data is organized in one or more flat lists that are then used to generate the XML document. Examples of flat lists include one that holds an association of namespace name values and prefixes that are assigned to the namespace name values; and another that holds an association of prefixes that are assigned to the namespace name values and one or more properties that are associated with the prefixes. This can greatly save on the memory resources that are required to generate XML requests.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

What is claimed is:

1. A method for building an extensible mark up language (XML) document comprising:

receiving a client request to add an XML namespace to an XML document that is being built by the client, the client request comprising a namespace name value;

producing a moniker responsive to receiving the client request;

associating the moniker with the XML namespace name value;

returning the moniker to the client; and further comprising using the moniker to make a second client request that is associated with the moniker's namespace name value.

2. The method of claim 1, wherein the second client request relates to adding a property of the namespace name value.

3. The method of claim 1, wherein the second client request relates to modifying a property value of the namespace name value.

4. One or more computer-readable media having computer-readable instructions thereon which, when executed by one or more processors, cause the one or more processors to implement the method of claim 1.

5. A method for building an extensible mark up language (XML) document comprising:

receiving a client request to add an XML namespace to an XML document that is being built by the client, the client request comprising a namespace name value;

producing a moniker responsive to receiving the client request;

associating the moniker with the XML namespace name value;

returning the moniker to the client; and further comprising:

assigning a prefix value to the namespace name value; and using the moniker to make a second client request that is associated with the moniker's namespace name value, the second client request producing an outcome value; and further comprising associating the prefix value for the namespace name value with the outcome value produced by the second client request.

6. The method of claim 5, wherein the second client request relates to modifying a property value of the namespace name value.

7. One or more computer-readable media having computer-readable instructions thereon which, when executed by one or more processors, cause the one or more processors to implement the method of claim 5.

8. A method for building an extensible mark up language (XML) document comprising:

creating a request object that is configured to process client requests into an XML document;

calling a first method in the request object for adding an XML namespace and responsive to calling said first method:

creating a moniker; and associating said moniker with an XML namespace name value for the namespace that is to be added;

calling at least one other method in the request object that is associated with at least one property of the XML namespace; and generating an XML document after said callings; and further comprising using said moniker to call said at least one other method.

9. The method of claim 8, wherein said at least one other method is associated with adding a property to the XML document.

10. The method of claim 8, wherein said at least one other method is associated with changing a property value that is associated with a property that is to appear in the XML document.

11. One or more computer-readable media having computer-readable instructions thereon which, when executed by one or more processors, cause the one or more processors to implement the method of claim 8.

12. A method for building an extensible mark up language (XML) document comprising:

creating a request object that is configured to process client requests into an XML document;

calling a first method in the request object for adding an XML namespace;

calling at least one other method in the request object that is associated with at least one property of the XML namespace;

generating an XML document after said callings; and wherein said calling of the at least one other method comprises defining a data configuration that is to be incorporated into the XML document, the data configuration being defined for adding a property of an XML namespace name value.

13. One or more computer-readable media having computer-readable instructions thereon which, when executed by one or more processors, cause the one or more processors to implement the method of claim 12.

14. A method for building an extensible mark up language (XML) document comprising:

creating a request object that is configured to process client requests into an XML document;

calling a first method in the request object for adding an XML namespace;

calling at least one other method in the request object that is associated with at least one property of the XML namespace;

generating an XML document after said callings; and wherein said calling of the at least one other method comprises defining a data configuration that is to be incorporated into the XML document, the data configuration being defined for modifying a value that is associated with a property of an XML namespace name value.

15. One or more computer-readable media having computer-readable instructions thereon which, when executed by one or more processors, cause the one or more processors to implement the method of claim 14.

16. A method for building an extensible mark up language (XML) document comprising:

creating a request object that is configured to process client requests into an XML document;

calling a first method in the request object for adding an XML namespace;

calling at least one other method in the request object that is associated with at least one property of the XML namespace;

generating an XML document after said callings, and further comprising:

defining a namespace arbiter that is configured to manage namespace name values that are to be added to the XML document, and to assign a prefix value to at least some of the namespace name values;

managing namespace name values that are to be added to the XML document with the namespace arbiter; and assigning prefix values to at least some of the namespace name values that are to be added to the XML document with the namespace arbiter.

17. The method of claim 16 further comprising creating at least one property object that maintains an association of assigned prefix values that are assigned by the namespace arbiter and one or more properties that are to be added to the XML document.

18. The method of claim 17, wherein the property object maintains a new value for at least one of the properties that it maintains, the new value being useable to modify the one property's value.

19. One or more computer-readable media having computer-readable instructions thereon which, when executed by one or more processors, cause the one or more processors to implement the method of claim 16.

20. A method for building an extensible mark up language (XML) document comprising:

assigning a prefix value to one or more XML namespace name values, each namespace name value having a unique prefix value;

associating each prefix value with one or more properties; and generating an XML document that contains the one or more namespace name values, their associated prefixes, and the one or more properties;

maintaining a collection of XML namespace name values and their associated prefix values; and wherein said maintaining comprises building a table of XML namespace name values and their associated prefix values.

21. The method of claim 20, wherein the assigning of the prefix value comprises receiving a specified namespace name value and assigning the prefix value responsive to said receiving.

22. One or more computer-readable media having computer-readable instructions thereon which, when executed by one or more processors, cause the one or more processors to implement the method of claim 20.

23. A method for building an extensible mark up language (XML) document comprising:

assigning a prefix value to one or more XML namespace name values, each namespace name value having a unique prefix value;

associating each prefix value with one or more properties; and generating an XML document that contains the one or more namespace name values, their associated prefixes, and the one or more properties;

wherein said associating further comprises associating at least one prefix value with a property whose value is to be modified.

24. The method of claim 23, wherein the assigning of the prefix value comprises receiving a specified namespace name value and assigning the prefix value responsive to said receiving.

25. The method of claim 23 further comprising maintaining a collection of XML namespace name values and their associated prefix values.

26. The method of claim 25, wherein said maintaining comprises building a table of XML namespace name values and their associated prefix values.

27. One or more computer-readable media having computer-readable instructions thereon which, when executed by one or more processors, cause the one or more processors to implement the method of claim 23.

28. A method for building an extensible mark up language (XML) document comprising:

assigning a prefix value to one or more XML namespace name values, each namespace name value having a unique prefix value;

associating each prefix value with one or more properties; and generating an XML document that contains the one or more namespace name values, their associated prefixes, and the one or more properties; and wherein the document is a PROPFIND request body.

29. The method of claim 28, wherein the assigning of the prefix value comprises receiving a specified namespace name value and assigning the prefix value responsive to said receiving.

30. The method of claim 28 further comprising maintaining a collection of XML namespace name values and their associated prefix values.

31. The method of claim 30, wherein said maintaining comprises building a table of XML namespace name values and their associated prefix values.

32. One or more computer-readable media having computer-readable instructions thereon which, when executed by one or more processors, cause the one or more processors to implement the method of claim 28.

33. A method for building an extensible mark up language (XML) document comprising:

assigning a prefix value to one or more XML namespace name values, each namespace name value having a unique prefix value;

associating each prefix value with one or more properties; and generating an XML document that contains the one or more namespace name values, their associated prefixes, and the one or more properties;

wherein the document is a PROPPATCH request body.

34. The method of claim 33, wherein the assigning of the prefix value comprises receiving a specified namespace name value and assigning the prefix value responsive to said receiving.

35. The method of claim 33 further comprising maintaining a collection of XML namespace name values and their associated prefix values.

36. The method of claim 35, wherein said maintaining comprises building a table of XML namespace name values and their associated prefix values.

37. One or more computer-readable media having computer-readable instructions thereon which, when executed by one or more processors, cause the one or more processors to implement the method of claim 33.

38. An extensible mark up language (XML) generator embodied on a computer-readable medium comprising:

a request object configured to receive client requests to build an XML document, individual requests containing a namespace name value; and a namespace arbiter associated with the request object and configured to maintain an association between namespace name values and individual prefixes that are assigned to each namespace name value, the prefixes being configured for use in generating the XML document.

39. The XML generator of claim 38 further comprising a data structure that is managed by the namespace arbiter, the data structure comprising:

a namespace name value portion for storing namespace name values that are contained in requests received by the request object; and a prefix portion for storing a prefix for each namespace name value that is stored in the namespace name value portion.

40. The XML generator of claim 38 further comprising a data structure that is managed by the namespace arbiter, the data structure comprising:

a moniker portion for storing a moniker that is associated with a namespace name value; and a namespace name value portion for storing namespace name values that are contained in requests received by the request object.

41. The XML generator of claim 38 further comprising a data structure that is associated with the namespace arbiter, the data structure comprising:

a property name portion for storing a prefix that is associated with each namespace name value and a property that is associated with each prefix; and a value portion for storing a value that is associated with a property that is stored in the property name portion.

42. The XML generator of claim 38 further comprising a data structure that is associated with the namespace arbiter, the data structure comprising a property name portion for storing a prefix that is associated with each namespace name value and a property that is associated with each prefix.

43. The XML generator of claim 38 further comprising first and second data structures that are associated with the request object;

the first data structure comprising:

a namespace name value portion for storing namespace name values that are contained in requests received by the request object; and a prefix portion for storing a prefix for each namespace name value that is stored in the namespace name value;

the second data structure comprising:

a property name portion for storing a prefix that is associated with each namespace name value and a property that is associated with each prefix.

44. The XML generator of claim 38 further comprising a data structure that is managed by the namespace arbiter, the data structure comprising:

a namespace name value portion for storing predefined namespace name values; and a prefix portion for storing a predefined prefix for each predefined namespace name value that is stored in the namespace name value.

45. The XML generator of claim 44, wherein the data structure further comprises a use status portion for tracking a use status of the predefined namespace name value.

46. The XML generator of claim 38, wherein the request object is a PROPFIND request object.

47. The XML generator of claim 38, wherein the request object is a PROPPATCH request object.

48. A data structure embodied on a computer-readable medium, for use in generating extensible mark up language (XML) documents comprising:

an XML namespace name value portion configured to hold one or more namespace name values; and a prefix portion configured to hold a prefix for each namespace name value that is held in the XML namespace name value portion.

49. The data structure of claim 48, wherein the XML namespace name value portion is configured to hold at least some namespace name values that are predefined; and wherein the prefix portion is configured to hold a predefined prefix for each of the predefined namespace name values.

50. The data structure of claim 48 further comprising a property name portion for storing a prefix that is associated with each namespace name value and a property that is associated with each prefix.

51. The data structure of claim 48 further comprising:
   a property name portion for storing a prefix that is associated with each namespace name value and a property that is associated with each prefix; and
   a value portion for storing a value that is associated with a property that is stored in the property name portion.

52. The data structure of claim 48, wherein the XML namespace name value portion is configured to hold at least some namespace name values that are predefined; and wherein the prefix portion is configured to hold a predefined prefix for each of the predefined namespace name values; and further comprising a property name portion for storing a prefix that is associated with at least some of the namespace name values and a property that is associated with each prefix.

53. The data structure of claim 48, wherein the XML namespace name value portion is configured to hold at least some namespace name values that are predefined; and wherein the prefix portion is configured to hold a predefined prefix for each of the predefined namespace name values; and further comprising:
   a property name portion for storing a prefix that is associated with at least some of the namespace name values and a property that is associated with each prefix; and
   a value portion for storing a value that is associated with a property that is stored in the property name portion.

54. A method of defining a data structure for use in creating an XML extensible mark up language (XML) document comprising:
   creating a namespace name value portion that is configured to hold one or more namespace name values;
   creating a prefix portion that is configured to hold a prefix for each namespace name value that is held in the namespace name value portion;
   placing at least one namespace name value in the namespace name value portion; and
   placing a prefix that is associated with the at least one namespace name value in the prefix portion
   wherein the placing of the at least one namespace name value comprises placing at least one reserved namespace name value in the namespace name value portion.

55. One or more computer-readable media having computer-readable instructions thereon which, when executed by one or more processors, cause the one or more processors to implement the method of claim 54.

56. A method of defining a data structure for use in creating an XML extensible mark up language (XML) document comprising:
   creating a namespace name value portion that is configured to hold one or more namespace name values;
   creating a prefix portion that is configured to hold a prefix for each namespace name value that is held in the namespace name value portion;
   placing at least one namespace name value in the namespace name value portion; and
   placing a prefix that is associated with the at least one namespace name value in the prefix portion;
   wherein the placing of the prefix comprises placing a reserved prefix in the prefix portion.

57. One or more computer-readable media having computer-readable instructions thereon which, when executed by one or more processors, cause the one or more processors to implement the method of claim 56.

58. A method of defining a data structure for use in creating an XML extensible mark up language (XML) document comprising:
   creating a namespace name value portion that is configured to hold one or more namespace name values;
   creating a prefix portion that is configured to hold a prefix for each namespace name value that is held in the namespace name value portion;
   placing at least one namespace name value in the namespace name value portion; and
   placing a prefix that is associated with the at least one namespace name value in the prefix portion; and further comprising:
      creating a property name portion for storing a prefix that is associated with a namespace name value and a property that is associated with each prefix.

59. One or more computer-readable media having computer-readable instructions thereon which, when executed by one or more processors, cause the one or more processors to implement the method of claim 56.

60. A method of generating an XML document comprising:
   receiving data that describes namespace name values and properties that are to appear in an XML document;
   organizing the data in one or more flat lists; and
   using the flat lists to generate an XML document.

61. The method of claim 60, wherein one of the flat lists holds an association of namespace name values and prefixes that are assigned to the namespace name values.

62. The method of claim 60, wherein one of the flat lists holds an association of prefixes that are assigned to the namespace name values and one or more properties that are associated with the prefixes.

63. The method of claim 60, wherein:
   one of the flat lists holds an association of namespace name values and prefixes that are assigned to the namespace name values; and
   another of the flat lists holds an association of prefixes that are assigned to the namespace name values and one or more properties that are associated with the prefixes.

64. One or more computer-readable media having computer-readable instructions thereon which, when executed by one or more processors, cause the one or more processors to implement the method of claim 60.

65. A method of generating an XML document comprising generating an XML document without storing a hierarchical tree structure that represents the XML document.

66. The method of claim 65, wherein said generating comprising doing so without building a hierarchical tree structure.

67. The method of claim 65, wherein said generating comprises building one or more flat lists that contain data and data associations and generating the XML document from the one or more flat lists.

* * * * *

UNITED STATES PATENT AND TRADEMARK OFFICE
CERTIFICATE OF CORRECTION

PATENT NO. : 6,675,353 B1
DATED : January 6, 2004
INVENTOR(S) : Friedman

It is certified that error appears in the above-identified patent and that said Letters Patent is hereby corrected as shown below:

Column 8,
Line 35, delete "to" between "client" and "application".

Column 14,
Line 14, insert -- to -- between "sent" and "the".

Column 15,
Line 67, replace "PROEIND" with -- PROFIND --.

Column 24,
Line 30, replace "claim 56" with -- claim 58 --.

Signed and Sealed this

Eighteenth Day of May, 2004

JON W. DUDAS
*Acting Director of the United States Patent and Trademark Office*